US006750160B1

(12) United States Patent
Hanaoka et al.

(10) Patent No.: US 6,750,160 B1
(45) **Date of Patent: *Jun. 15, 2004**

(54) DETERGENT-IMPREGNATED ARTICLE

(75) Inventors: Koji Hanaoka, Haga-gun (JP); Eiichi Hoshino, Haga-gun (JP); Fumiko Inaba, Haga-gun (JP); Hironobu Sionome, Haga-gun (JP)

(73) Assignee: Kao Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/284,735

(22) PCT Filed: Dec. 4, 1997

(86) PCT No.: PCT/JP97/04448

§ 371 (c)(1), (2), (4) Date: Apr. 19, 1999

(87) PCT Pub. No.: WO98/26040

PCT Pub. Date: Jun. 18, 1998

(30) Foreign Application Priority Data

| | | |
|---|---|---|
| Dec. 9, 1996 | (JP) | 8-328778 |
| Apr. 11, 1997 | (JP) | 9-094241 |
| Apr. 11, 1997 | (JP) | 9-094242 |

(51) Int. Cl.[7] .............................. B32B 5/16; B08B 1/00

(52) U.S. Cl. .............................. 442/72; 442/71; 442/99; 442/153; 442/164; 442/165; 442/168; 442/170; 442/171; 15/104.93; 15/228; 510/438; 510/439

(58) Field of Search .............................. 442/72, 71, 164, 442/165, 168, 170, 171, 153, 99; 15/104.93, 209.1, 720.1, 228; 510/438, 439

(56) References Cited

U.S. PATENT DOCUMENTS

| | | | | | |
|---|---|---|---|---|---|
| 3,711,884 A | * | 1/1973 | Feig | 252/79.1 |
| 4,027,067 A | | 5/1977 | Wagner et al. | 428/407 |
| 4,133,906 A | | 1/1979 | Kuehnle | 430/119 |
| 4,138,351 A | | 2/1979 | Gilliams et al. | 430/114 |
| 4,160,844 A | | 7/1979 | Orr et al. | 514/455 |
| 4,212,759 A | | 7/1980 | Young et al. | 510/400 |
| 4,347,151 A | * | 8/1982 | Lohr et al. | 252/163 |
| 4,381,792 A | | 5/1983 | Busch, Jr. et al. | 132/75.6 |
| 4,725,489 A | * | 2/1988 | Jones et al. | 442/121 |
| 4,818,508 A | | 4/1989 | Flank et al. | 423/712 |
| 4,833,003 A | * | 5/1989 | Win et al. | 442/392 |
| 5,213,588 A | * | 5/1993 | Wong et al. | 51/293 |
| 6,117,830 A | * | 9/2000 | Yokosuka et al. | 510/242 |
| 6,376,046 B1 | * | 4/2002 | Hoshino et al. | 428/156 |
| 6,503,136 B1 | * | 1/2003 | Rose et al. | 451/533 |

FOREIGN PATENT DOCUMENTS

| | | | |
|---|---|---|---|
| CN | 1070681 A | | 4/1993 |
| EP | 0100195 A2 | | 2/1984 |
| EP | 0273594 A1 | | 7/1988 |
| JP | 59-49728 | | 3/1959 |
| JP | 5539023 | | 9/1978 |
| JP | 5436065 | | 3/1979 |
| JP | 5360666 | | 10/1981 |
| JP | 587496 | | 1/1983 |
| JP | 58-154778 | | 9/1983 |
| JP | 58-206750 | | 12/1983 |
| JP | 59-189822 | | 10/1984 |
| JP | 61-108700 | * | 5/1986 |
| JP | 2695162 | | 3/1988 |
| JP | 6386774 | | 4/1988 |
| JP | 63-222728 | | 9/1988 |
| JP | 648351 | | 1/1989 |
| JP | 3-29632 | | 2/1991 |
| JP | 3-141383 | | 6/1991 |
| JP | 5-7015 | | 1/1993 |
| JP | 5-15481 A | | 1/1993 |
| JP | 6017356 | | 1/1994 |
| JP | 6125862 | | 5/1994 |
| JP | 751211 | | 2/1995 |
| JP | 7-252454 | | 3/1995 |
| JP | 2528000 | | 6/1996 |

OTHER PUBLICATIONS

Senzai Senjo No Jiten (Cyclopedia of Cleaner and Detergent) Nov. 25, 1990, pp 121, 526–528.

The Chemical Formulary, vol. XXII, Chemical Publishing Co., Inc. pp3, 325, 366–367, 370 and 372–373.

"Information About Dow Corning Silicone Fluids" 1995 Dow Corning Corp.

ESSO Technical Information, No. 2 SERIES Solvent, Mar. 18, 1963 (excerpts).

Celite & Micro–Cel Functional Fillers, The Diatomite and Calcium Silicate Mineral Fillers, John–Manville, pp 1 and 21.

"Carbopol, Water–Soluble Resins", B.F. Goodrich Chemical Co.

Shnpan Senjo to Senzai (New version Cleaning and Detergent), Apr. 1, 1976, pp 164–167.

* cited by examiner

*Primary Examiner*—Terrel Morris
*Assistant Examiner*—John J. Guarriello
(74) *Attorney, Agent, or Firm*—Birch, Stewart, Kolasch & Birch, LLP

(57) ABSTRACT

A detergent-impregnated article, especially suitable for cleaning hard surface such as glass, characterized in that a base body is impregnated with a detergent comprising solid abrasive particles, a protective layer-forming component, an organic solvent, a drying accelerator, a thickening polysaccharide and a surface active agent.

12 Claims, 2 Drawing Sheets

DETERGENT-IMPREGNATED ARTICLE

This application is the national phase under 35 U.S.C §371 of PCT International Application No. PCT/JP97/04448 which has an International filing date of Dec. 4, 1997 which designated the United States of America.

TECHNICAL FIELD

The present invention relates to a detergent-impregnated article and more particularly to a detergent-impregnated article which wipes off dirt easily, leaves no streaks after being wiped dry, and makes the cleaned surface stain-resistant. In addition, the present invention relates to a detergent-impregnated article in which solid detergent particles are maintained in a stable dispersed state in the base body thereof without localizing, settling or floating even after long-term storage.

BACKGROUND ART

A hard surface, such as glass or a motorcar body, is usually cleaned by applying a liquid detergent containing a surface active agent, an alkali, etc. to the surface by spraying and the like, wiping off the applied detergent with wet cloth, and giving another wipe with dry cloth (hereinafter sometimes referred to as dry wiping). This cleaning method is very tedious because the detergent, dust components, loose fluff of the cloth, etc. tend to stick to the surface after a first dry wiping as streaks so that additional wipes with a dry cloth must be done.

Concerning liquid detergents impregnated into a base sheet, techniques of adding water-insoluble solid particles (e.g., abrasive particles) for enhancing detergency or adding an opacifying agent (e.g., a synthetic resin emulsion) for imparting viscosity are known. It is a generally followed practice to thicken a solid-disperse liquid detergent so as to stabilize the dispersibility of the solid particles and to retain a uniform disperse phase. However, a detergent must have a very high viscosity before solid particles having a large specific gravity or a relatively large particle size can be dispersed therein. Such a highly viscous detergent is difficult to impregnate into a base sheet or to release from a base sheet to the surface on which the impregnated article is, applied. Even though the detergent can be supplied to a hard surface, it has poor spreadability on the surface or needs additional time and labor to be wiped away, which deteriorates the cleaning efficiency.

If the viscosity of the detergent is low, the solid particles localize, settle or float in the base body when stored for a long time. It follows that the solid particles are not supplied in adequate amounts to a surface to be cleaned, or there is an imbalance of cleaning performance between the face and the back of the base.

DISCLOSURE OF THE INVENTION

Accordingly, an object of the present invention is to provide a detergent-impregnated article with which dirt can be removed by giving a light wipe and which leaves no streaks after wiping.

Another object of the present invention is to provide a detergent-impregnated article which imparts stain resistance to the surface cleaned therewith.

A further object of the present invention is to provide a detergent-impregnated article with which dirt can easily be wiped away from a large area.

Yet another object of the present invention is to provide a detergent-impregnated article in which solid particles are stably dispersed in the base body without localizing, settling or floating even when stored for a prolonged time.

As a result of an extensive study, the inventors of the present invention have found that the above objects are accomplished by a detergent-impregnated article comprising a base body and a detergent impregnated in the base body, with the detergent comprising specific components.

The present invention has been completed based on the above finding. The present invention has achieved the above objects and is directed to a detergent-impregnated article comprising a base body and a detergent impregnated in the body, the detergent comprising solid abrasive particles and a protective layer-forming component, and the solid abrasive particles consisting of organic polymer particles and/or inorganic particles.

The present invention is also directed to a detergent-impregnated article for cleaning a hard surface comprising a base body and a detergent impregnated in the body, which provides a static friction coefficient of 0.1 to 1.0 to the surface of a flat and transparent soda-lime glass plate after the detergent-impregnated article is applied to the surface to supply the detergent thereto and then dirt and the detergent are wiped off the surface with a wiping sheet.

The present invention is also directed to a method for cleaning a hard surface comprising the steps of:

wiping a hard surface to be cleaned with a detergent-impregnated article comprising a base body and a detergent impregnated in the base body to apply the detergent to the hard surface and to release dirt from the hard surface, the detergent comprising solid abrasive particles and a protective layer-forming component, and then wiping the hard surface with a wiping sheet to remove the dirt and the detergent and to form a stain-resistant protective layer on the surface.

PREFERRED EMBODIMENTS FOR CARRYING OUT THE INVENTION

Figure 1:
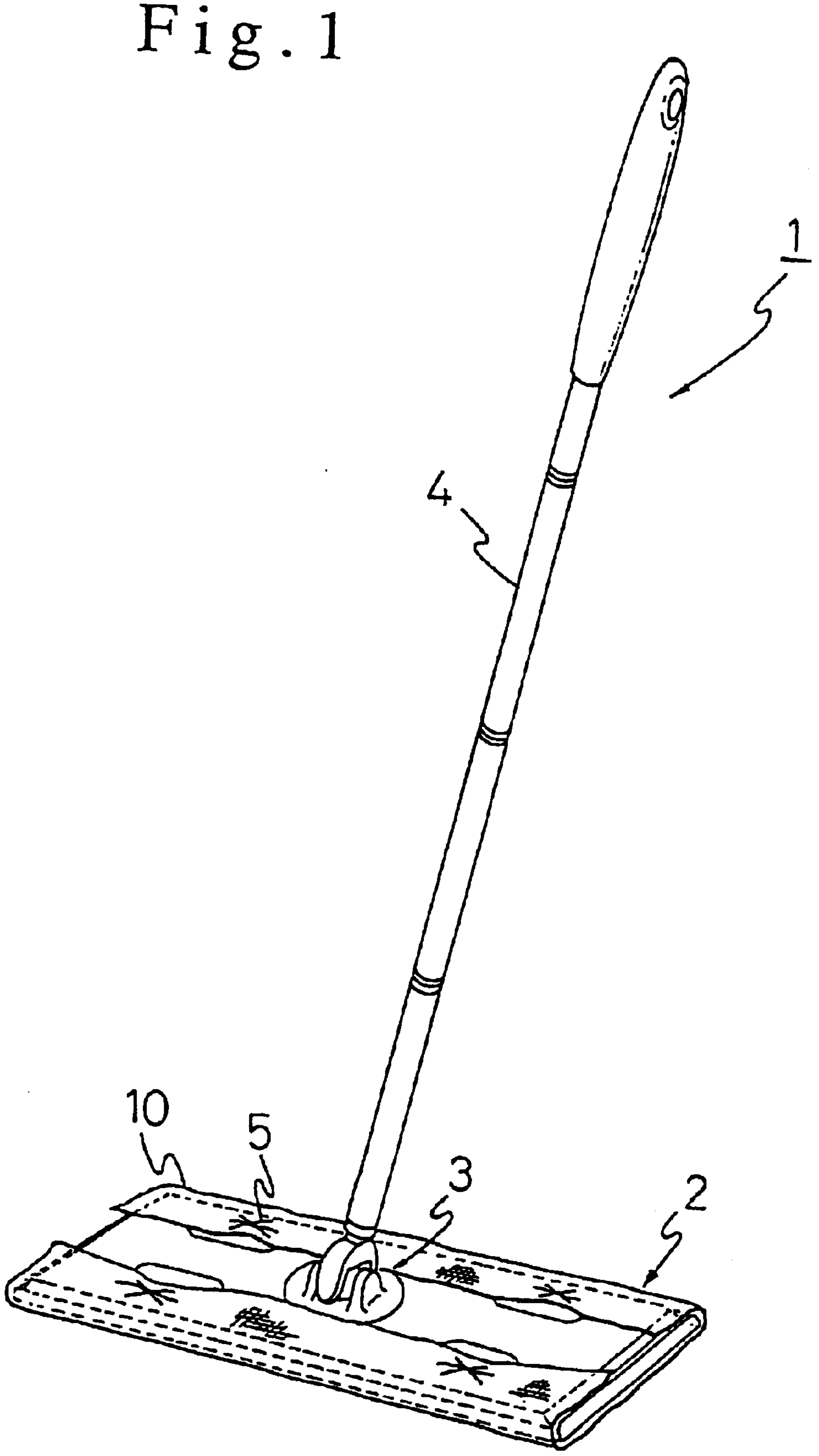
FIG. 1 is a perspective view of a cleaning apparatus to which the detergent-impregnated article of the present invention is fitted, and FIG. 2 schematically illustrates the method for cleaning a glass surface with the detergent-impregnated article of the present invention.

The detergent-impregnated article according to the present invention comprises a base body and a detergent, wherein the base body is impregnated with the detergent, said detergent comprising solid abrasive particles and a protective layer-forming component.

The solid abrasive particles which can be used in the detergent are capable of abrading and removing dirt from a surface to be cleaned. More particularly, the solid abrasive particles mix with dirt on a surface to be cleaned thereby to release the dirt from the surface in a powdered state. The solid abrasive particles consist of organic polymer particles and/or inorganic particles. One or more than one kind of abrasive particles can be used.

Particularly, the solid abrasive particles preferably comprise at least one of the following components (1) to (5).

(1) A polymer obtained by polymerizing a monomer or monomer mixture containing at least one ethylenically unsaturated monomer selected from the group consisting of an alkyl acrylate or methacrylate having 1 to 8 carbon atoms in the alkyl moiety thereof, a mono- or dialkyl itaconate or fumarate having 1 to 5 carbon atoms in the alkyl moiety thereof, maleic anhydride, vinylidene chloride, styrene, divinylbenzene, vinyl chloride, vinyl acetate, vinyl acetal, ethylene, propylene, butene, butylene, methylpentene, butadiene, vinyltoluene, acrylonitrile, methacrylonitrile, acrylamide, acrylic acid, methacrylic acid, itaconic acid, fumaric acid, citraconic acid, crotonic acid, β-acryloxypropionic acid, and a hydroxyalkyl acrylate or methacrylate having 1 to 6 carbon atoms in the alkyl moiety thereof, or a polyblend containing the polymer.

Of the above polymers or polyblends, preferred are polymers obtained by polymerizing a monomer or monomer mixture containing an ethylenically unsaturated monomer, such as alkyl acrylate, methacrylate, styrene, ethylene and propylene. Still preferred are polymers obtained by polymerizing a monomer or monomer mixture containing an ethylenically unsaturated monomer, such as methacrylate and styrene. Examples of such polymers are polyethylene, polypropylene, polystyrene, polyvinyl chloride, polymethacrylate, an acrylic ester/acrylic acid/methacrylic ester/methacrylic acid/styrene copolymer, and a crosslinked polymethacrylic ester.

(2) A silicone derivative (silicone rubber) having at least one constituent unit selected from the group consisting of a unit represented by formula (I) and a unit represented by formula (I'):

(I)

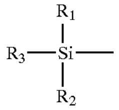

(I')

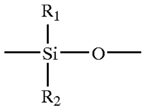

wherein $R_1$, $R_2$, and $R_3$, which may be the same or different, each represent an alkyl, alkoxy or hydroxyalkyl group having 1 to 100 carbon atoms, a hydroxyl group, a carboxyl group, a carboxyalkyl group, an N-(2-aminoalkyl) aminoalkyl group, an aminoalkyl group, an amino group, an epoxyalkyl group, an epoxy group, a methylpolyoxyethylenealkyl group, a hydroxypolyoxyethylenealkyl group, a methylpolyoxyethylene polyoxypropylene group, a hydroxypolyoxyethylene polyoxypropylene group, an alkylpolyoxypropylene group, a polyoxyethylene group, a phenyl group or a fluorinated alkyl group, Of the above silicone derivatives (silicone rubber), preferred are dimethylpolysiloxane having a high degree of polymerization (silicone rubber).

(3) At least one resin selected from nylon, polyester, an epoxy resin, an aminoalkyd resin, a urethane resin, polyacetal, and polycarbonate.

Of the above resins, preferred are polyester, nylon, polycarbonate, polyacetal, and a urethane resin.

(4) An organopolysilsesquioxane, preferably an organopolysilsesquioxane (silicone resin) obtained by hydrolysis and condensation of a methyltrialkoxysilane or a partial hydrolyzate thereof and/or a partial condensate thereof in an aqueous solution of ammonia or an amine.

(5) At least one water-insoluble inorganic substance selected from silica, porous silica, sodium silicate glass, soda-lime glass powder, aluminosilicate, silicon carbide, a sheet silicate, quartz sand, aluminum oxide, magnesium oxide, titanium oxide, calcium carbonate, calcium phosphate, chromium oxide, emery, dolomite, mica powder, siliceous stone, diatomaceous earth, kaolinite, halloysite, montmorillonite, illite, vermiculite, hectorite, bentonite, chitin powder, chitosan powder, and hydroxyapatite.

Of the above water-insoluble inorganic substances, preferred are silica, porous silica, soda-lime glass powder, diatomaceous earth, kaolinite, montmriilonite, hectorite, and bentonite.

Of the above-mentioned solid abrasive particles (1) to (5), preferred examples include (1) polymers obtained by polymerizing a monomer or monomer mixture containing an ethylenically unsaturated monomer such as alkyl acrylate, methacrylate, styrene, ethylene and propylene, (2) dimethylpolysiloxane having a high degree of polymerization (silicone rubber).

(3) resins such as polyester, nylon, polycarbonate, polyacetal and a urethane resin, (4) an organopolysilsesquioxane (silicone resin) obtained by hydrolysis and condensation of a methyltrialkoxysilane- or a partial hydrolyzate thereof and/or a partial condensate thereof in an aqueous solution of ammonia or an amine, and (5) water-insoluble inorganic substances such as silica, porous silica, soda-lime glass powder, diatomaceous earth, kaolinite, montmrillonite, hectorite, and bentonite.

Of the above-mentioned solid abrasive particles, those included in the above preferred examples and included under groups (2) or (4) are particularly preferred.

Where the polymer of group (1) is used as the solid abrasive particles, it is preferable for efficient preparation that the polymer be obtained by emulsion polymerization or suspension polymerization of the ethylenically unsaturated monomer(s) of group (1).

The solid abrasive particles preferably have an average primary particle size of 0.01 to 100 μm, still preferably 0.1 to 100 μm, and particularly 1 to 10 μm, from the standpoint of spredability of the detergent in wiping, mixing properties with dirt, abrading performance against dirt, and case of wiping with the detergent-impregnated article. The average primary particle size as used herein is a value obtained with a laser diffraction/scattering particle size analyzer (LA910 manufactured by Horiba Seisakusho).

While there is no particular limit to the shape of the solid abrasive particles, a spherical shape is desirable from viewpoint of enhancement of every property of the detergent. When the solid abrasive particles are spherical particles, they preferably have an average primary particle size of 0.01 to 15 μm, more preferably 0.1 to 10 μm, still more preferably 1 to 5 μm.

When the solid abrasive particles are spherical particles, the spherical particles will have improved performance in various properties as they approximate to true spheres. While it is ideal for all the particles to be true spheres for manifestation of the advantageous effects of the present invention, the effects of the present invention can be produced sufficiently as long as 90% or more, in number, of the spherical particles have a projected image of a true circle, or every spherical particle has a projected image whose outline is confined between a circle circumscribing the projected image and a concentric circle whose radius is 90% of that of the circumscribing circle. As a matter of course, even amorphous particles could be used with no problem provided that the advantageous effects of the present invention are not ruined. The method for measuring the shape of the spherical particles will be described in Examples hereinbelow.

The solid abrasive particles preferably have a pencil hardness of 6B to 9H, particularly H to 8H, for preventing scratches to a general hard surface.

In order to prevent the solid abrasive particles from being localized in the base body, the solid abrasive particles preferably have a true specific gravity of 0.5 to 2.5, still preferably 0.5 to 1.5, particularly preferably 1.0 to 1.5.

For satisfying spreadability of the detergent, removability of the detergent by wiping off, and stability in the base body, it is particularly desirable that the solid abrasive particles have an average particle size of 0.1 to 10 $\mu$m (particularly 1 to 5 $\mu$m) in spherical shape and a true specific gravity of 0.5 to 1.5.

In view of spreadability of the detergent, removability of the dirt by wiping off, operating properties of the detergent-impregnated article, and releasability of the detergent from the base body, it is preferable that the major component of the solid abrasive particles have a surface energy of not more than 80 mN/m when measured independently in the form of a plane. The surface energy of the major component is still preferably not more than 50 mN/m, particularly preferably not more than 30 mN/m. The smaller the surface energy, the better. There is no particular lower limit of the surface energy.

The term "major component" as used herein is intended to mean the component which has a higher weight proportion than any other components constituting the solid abrasive particles. It is particularly preferable for the major component to form a proportion of 50% by weight or more of all the components constituting the solid abrasive particles. The method for measuring the surface energy will be described in Examples hereinafter given.

The solid abrasive particles are preferably present in the detergent in an amount of 0.1 to 30% by weight, particularly 0.1 to 20% by weight, more preferably 1 to 10% by weight, still more preferably 2 to 5% by the detergent may fail to have sufficient detergent performance. If it exceeds 30% by weight, the detergent is difficult to wipe off, tending to remain on the surface to be cleaned.

The protective layer-forming component used in the detergent is capable of forming a protective layer on the surface to be cleaned after the detergent-impregnated article was applied. Organopolysiloxanes are such a protective layer-forming component. Specific examples of organopolysiloxanes include silicone oil, such as dimethylpolysiloxane, methylhydrogenpolysiloxane and methylphenylsilicone oil, fluorine-modified silicone oil, amino-modified silicone oil, epoxy-modified silicone oil, alcohol-modified silicone oil, and organic substance-modified silicone oil, such as alkyl-modified silicone oil. The protective layer-forming component forms a layer (protective layer) on the surface to be cleaned to impart stain resistance to the surface. A protective layer-forming component which gives a static friction coefficient of 0.1 to 1.0, particularly 0.1 to 0.5, to the surface to be cleaned after wiping is particularly preferred. The above protective layer-forming components can be used either individually or as a combination of two or more thereof.

For obtaining excellent spreadability of the detergent and protective layer-forming properties, it is particularly preferable to use an organopolysiloxane that is a liquid at ambient temperature (20° C.) and contains at least one constituent unit selected from the group consisting of formula (I) and represented by formula (I'), above. Those having at least one organo group selected from a phenyl group and an alkyl group having 1 to 80 carbon atoms are particularly preferred for obtaining the above properties.

The most preferred organopolysiloxanes are represented by formula (I"):

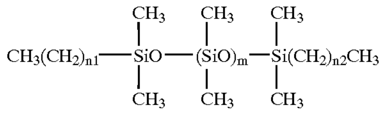

(I")

wherein n1 and n2 each represent an integer of 0 to 100; and m represents an interger of 1 to 5,000.

In formula (I"), n1 and n2 each preferably represent and an integer of 0 to 50, and m preferably represents an integer of 1 to 1,000.

The protective layer-forming component is preferably present in the detergent in an amount of 0.01 to 20% by weight, more preferably 0.05 to 10% by weight,.still more preferably 0.1 to 5% by weight, particularly 0.1 to 1% by weight, more particularly 0.2 to 0.5% by weight. If the content of the protective layer-forming component is less than 0.01% by weight, the detergent-impregnated article may fail to form a sufficient protective layer on the surface to be cleaned for sufficient stain resistance. If it exceeds 20% by weight, the excess of the protective layer-forming component may remain on the surface to be cleaned to make the surface garish.

Particularly, in relation to the amount of the solid abrasive particles, the protective layer-forming component is preferably added in an amount of 1 to 200 parts by weight, more preferably 2 to 100 parts by weight, still more preferably 5 to 50 parts by weight, per 100 parts by weight of the solid abrasive particles.

It is also desirable for the detergent to contain an organic solvent in view of detergency for oily stains, spreadability of the detergent in wiping, and removability of the dirt by wiping. One or more than one organic solvents can be used. Examples of the organic solvents are n-paraffin, kerosine, petroleum benzine, xylene, n-hexane, and cyclohexane.

Taking formulation stability into consideration, the organic solvent to be used is preferably one or more than one member selected from the group consisting of the following groups (6) to (10).

(6) A straight-chain, branched or cyclic hydrocarbon which is a liquid at ambient temperature.

Preferred examples are straight-chain or branched paraffins having 10 to 16 carbon atoms, such as decane, dodecane, tridecane, tetradecane, hexadecane, isodecane, isododecane, isotridecane, isotetradecane, and isohexadecane.

(7) An ester oil which has 10 to 60 carbon atoms and is liquid at ambient temperature.

Preferred examples are those represented by formula (IV) or (IV'):

$$R_9COOR_{10} \qquad (IV)$$

wherein $R_9$ represents a straight-chain or branched alkyl or alkenyl group having 7 to 21 carbon atoms; and $R_{10}$ repre sents a straight-chain or branched alkyl or alkenyl group having 1 to 20 carbon atoms.

(IV')

$$\begin{array}{l} CH_2COOR_{11} \\ | \\ CHCOOR_{12} \\ | \\ CH_2COOR_{13} \end{array}$$

wherein $R_{11}$, $R_{12}$, and $R_{13}$, which may be the same or different, each represent a straight-chain or branched alkyl or alkenyl group having 1 to 20 carbon atoms; and the total number of the carbon atoms in $R_{11}$, $R_{12}$ and $R_{13}$ is 8 or greater.

Specific examples of the ester oils are isopropyl myristate isopropyl palmitate, isopropyl isostearate, methyl stearate, butyl stearate, butyl myristate, ethyl linoleate, isopropyl linoleate, ethyl oleate, myristyl myristate, cetyl palmitate, cetyl isooctanoate, isostearyl palmitate, glycerol tri-2-ethylhexanoate, and glycerol tri-2-hexyldecanoate.

(8)A glycol ether represented by formula (II):

$$R_4O(CH_2CH_2O)_q(\underset{R_6}{CH}\underset{R_7}{CH}O)_rR_5 \qquad (II)$$

wherein $R_4$ and $R_5$ each represent a straight-chain or branched alkyl group having 1 to 8 carbon atoms, a hydroxyl group or a hydrogen atom; q and r each represent a number of 0 to 20; and $R_6$ and $R_7$ each represent a hydrogen atom or a methyl group, provided that $R_6$ and $R_7$ are different, Specific examples are diethylene glycol monoethyl ether, diethylene glycol monobutyl ether, diethylene glycol dimethyl ether, diethylene glycol diethyl ether, propylene glycol monomethyl ether, propylene glycol monoethyl ether, dipropylene glycol monomethyl ether, dipropylene glycol monoethyl ether, and dipropylene glycol dimethyl ether.

(9)A polyhydric alcohol having 4 to 12 carbon atoms.

Specific examples are 3-methyl-1,3-butanediol, 2,2,4-trimethyl-1,3-pentanediol, 1,8-octanediol, and 1,9-nonanediol.

(10)A compound represented by formula (III):

$$CH_3(CH_2)_s(CH_2CH_2O)_t(CH_2CH_2CH_2O)_u(CH_2)_vR_8 \qquad (III)$$

wherein $R_8$ represents a hydrogen atom, a methyl group or a hydroxyl group; and s, t, u, and v each represent an integer of 0 to 100.

In the compound represented by formula (III), s, t, u, and v each preferably represent an integer of 0 to 50.

(11)A cyclic silicone

Specific examples of the cyclic silicone are octamethylcyclotetrasiloxane, decamethylcyclopentasiloxane and dodecamethylcyclohexasiloxane.

Of the above-enumerated organic solvents, those included under group (6), especially straight-chain paraffins that are liquid at ambient temperature are preferably used.

The organic solvent preferably has a boiling point of 70 to 300° C. from the viewpoint of detergency for oily stains, spreadability of the detergent in wiping, and removability of the dirt by wiping.

The organic solvent is preferably used in an amount of 0.05 to 60% by weight based on the detergent. If the organic solvent content is less than 0.05% by weight, the detergent may exhibit insufficient detergency for oily stains, or the cleaning operation of the detergent-impregnated article may become heavy. Quantities of the organic solvent exceeding 60% by weight may be difficult to stably formulate or remain on a hard surface as an oil layer. A still preferred amount of the organic solvent is 0.1 to 30% by weight.

Where the detergent contains the organic solvent, the detergent preferably comprises 0.1 to 20% by weight of the solid abrasive particles, 0.01 to 20% by weight of the protective layer-forming component, 0.05 to 60% by weight of the organic, and the balance of water.

In a preferred embodiment, the detergent further contains a thickening polysaccharide to maintain the solid abrasive particles in a stable dispersed state in the base body without localizing, settling or floating even after long-term storage. The thickening polysaccharide as used herein is capable of increasing the viscosity, of the detergent to a prescribed range for stably dispersing the solid abrasive particles in the base body for a long period of time (The viscosity of the detergent will be described later). The thickening polysaccharide may comprise a single material or two or more materials. In particular, the thickening polysaccharide preferably comprises at least one of the following materials from (12), (13) and (14).

(12)Guar gum, locust bean gum, quince seed gum, tara gum, carrageenan, alginic acid or a salt thereof, furcellaran, agar, arabino galactan gum, gum arabic, tragacanth gum, gum karaya, pectin, amylose, amylopectin, pullulan, starch, xantham gum, curdlan, succinoglucan, schizophyllan, gellan gum, welan gum, rhamsan gum, galactomannan, hyaluronic acid or a salt thereof, chondroitin sulfuric acid or a salt thereof, chitin, and chitosan.

Of the above polysaccharides, guar gum, locust bean gum, tara gum, carrageenan, alginic acid or a salt thereof, pectin, pullulan, xanthan gum, gellan gum, welan gum, rhamsan gum, and hyaluronic acid or a salt thereof are preferred, with xanthan gum being particularly preferred.

(13)Derivatives of the polysaccharides of group (12) which are obtained by oxidation, methylation, carboxymethylation, hydroxyethylation, hydroxypropylation, sulfation, phosphorylation or cationization. The term "derivatives" as used herein is intended to include those derived from the above-described polysaccharides by a combination of two or more of the above-described chemical changes, such as those obtained by carboxymethylhydroxypropylation.

Of the above polysaccharide derivatives, carboxymethylated, hydroxyethylated, hydroxypropylated and cationized derivatives are preferred.

(14)Water-soluble cellulose derivatives.

The above water-soluble cellulose derivatives include carboxymethyl cellulose, methyl cellulose, hydroxyethyl cellulose, hydroxypropyl cellulose, and hydroxyethylpropyl cellulose. Preferred of them are carboxymethyl cellulose and hydroxyethyl cellulose.

Of the above-described thickening polysaccharides, the compounds included under group (12) are preferred, with xanthan gum being especially preferred.

The content of the thickening polysaccharide in the detergent is preferably 0.01 to 10% by weight. If it is less than 0.01% by weight the detergent may not be sufficiently thickened, failing to retain the solid abrasive particles in a stable dispersed state in the base body for a long time. If the content exceeds 10% by weight, the detergent may be too viscous to be impregnated into the base body or, if impregnated, the detergent may be hardly released from the base body on wiping. In addition, such a viscous detergent is not easily wiped off, tending to leave streaks on a hard surface. The thickening polysaccharide is more preferably contained in the detergent in an amount of 0.02 to 5% by weight, still more preferably 0.05 to 2% by weight.

For obtaining formulation stability and detergency of the detergent, it is also preferable for the detergent to contain at least one of a surface active agent and a polymeric dispersant. The surface active agent and the polymeric dispersant are each preferably added in an amount of 0.005 to 20% by weight, more preferably 0.005 to 10% by weight, still more preferably 0.01 to 10% by weight, particularly preferably 0.01 to 5% by weight, more particularly preferably 0.02 to 1% by weight, based on the weight of the detergent.

Various known surface active agents (e.g., anionic, cationic, nonionic or amphoteric surface active agents) can be used with no particular limitation. They can be used either individually or as a combination of two or more thereof.

Preferred surface active agents include alkylbenzenesulfonates having a straight-chain or branched alkyl group containing 8 to 18 carbon atoms, polyoxyethylene alkyl ether sulfates having 0.5 to 10 mol, in average, of an oxyethylene unit and a straight-chain or branched alkyl group containing 8 to 22 carbon atoms, alkylsulfates having a straight-chain or branched alkyl group containing 8 to 18 carbon atoms, fatty acid salts having a straight or branched chain comprising 8 to 22 carbon atoms, polyoxyethylene alkyl ether carbonates having 0.5 to 10 mol, in average, of an oxyethylene unit and a straight-chain or branched alkyl group having 8 to 22 carbon atoms, alkyl sulfonates having a straight-chain or branched alkyl group containing 8 to 22 carbon atoms, alkyl glycosides comprising a straight-chain or branched alkyl group containing 8 to 22 carbon atoms and having an average degree of sugar condensation of 1.0 to 10.0, fatty acid glycerides having a straight or branched chain containing 8 to 22 carbon atoms in their fatty acid moiety, sorbitan fatty acid esters having a straight or branched chain containing 8 to 22 carbon atoms in their fatty acid moiety, alkyltrimethylammonium salts having a straight-chain or branched alkyl group containing 8 to 18 carbon atoms in their alkyl moiety, and alkyldimethylbenzylammonium salts having a straight-chain or branched alkyl group containing 8 to 18 carbon atoms in their alkyl moiety, and mixtures of two or more thereof. The counter ions in the anionic surface active agents include alkali metals, alkaline earth metals, ammonium, and alkanolamines having 1 to 3 carbon atoms, and those in the cationic surface active agents include halogen atoms and an alkylsulfuric acid residue having 1 to 6 carbon atoms.

Of these surface active agents, alkyl glycosides such as dodecyl glycoside, and polyvalent anionic surface active agents such as alkyl sulfonates, for example, alkyl diphenyl ether disulfonate, are preferred because they hardly cause streaks.

From the standpoint of formulation stability and detergency of the detergent, the average alkyl chain length of these surface active agents is preferably 8 to 18 carbon atoms per molecule.

The polymeric dispersant to be used is selected from those capable of improving the dispersibility of dirt and reducing the possibility of the dirt's re-contaminating the surface to be cleaned. In particular, the polymeric dispersants include those obtained by polymerizing a monomer or monomer mixture containing at least one ethylenically unsaturated monomer selected from the group consisting of an alkyl acrylate or thethacrylate having 1 to 8 carbon atoms in the alkyl moiety thereof, a mono- or dialkyl itaconate or fumarate having 1 to 5 carbon atoms in the alkyl moiety thereof, maleic anhydride, vinylidene chloride, styrene, divinylbenzene, vinyl chloride, vinyl acetate, vinyl acetal, ethylene, propylene, butene, butylene, methylpentene, butadiene, vinyltoluene, acrylonitrile, methacrylonitrile, acrylamide, acrylic acid, methacrylic acid, itaconic acid, fumaric acid, citraconic acid, crotonic acid, β-acryloxypropionic acid, and a hydroxyalkyl acrylate or methacrylate having 1 to 6 carbon atoms in the alkyl moiety thereof, vinylpyrrolidone, and their derivatives are preferred for their stability in formulation. These polymeric dispersants can be used either individually or as a combination of two or more thereof.

Other components which can be incorporated into the detergent include alkalis for enhancing the detergent action of the detergent-impregnated article, lubricants for enhancing the lubricity of the detergent-impregnated article, drying accelerators (e.g., ethanol), antifungals for prevention of mold, perfumes, pigments, and the like. These components can be added in an amount of 5 to 50% by weight, preferably 10 to 30% by weight, based on the weight of the detergent.

The drying accelerator is used where the detergent is required to dry rapidly, for example, for cleaning rooms or narrow spaces. It is added to the detergent in an amount preferably of 0.2 to 30% by weight, still preferably of 5 to 30% by weight, more preferably 10 to 25% by weight. If the content is less than 0.2% by weight, a sufficient drying accelerating effect may not be manifested. A content exceeding 30% by weight does not produce a corresponding increase in effect, only to result in false economy. Examples of the drying accelerator, other than ethanol, include isopropanol, propanol, butanol, methanol and a mixture of one or more of these alcohols and ethanol.

Where the detergent contains the drying accelerator, the detergent preferably contains 0.1 to 20% by weight of the solid abrasive particles, 0.01 to 20% by weight of the protective layer-forming component, 0.05 to 60% by weight of the organic solvent, 0.2 to 30% by weight of the drying accelerator, and the balance of water. More preferably, the detergent contains 0.5 to 30% by weight of the drying accelerator.

The detergent preferably comprises water as a medium in order to secure spreadability of the detergent on a surface to be cleaned, handling properties, and penetrability into a base body. Water is preferably used in a proportion of 50 to 98.9% by weight, particularly 65 to 95% by weight, based on the weight of the detergent. If the water content is less than 50% by weight, the solid abrasive particles and the protective layer-forming component may not spread uniformly on a surface to be cleaned. If it exceeds 98.9% by weight, the amounts of the solid abrasive particles and the protective layer-forming component supplied to a surface to be cleaned may be insufficient for cleaning.

Particularly, in relation to the amount of the solid abrasive particles, water is preferably used in a proportion of 100 to 10,000 parts by weight, more preferably 500 to 5,000 parts by weight, still more preferably 1,000 to 4,000 parts by weight, per 100 parts by weight of the solid abrasive particles.

The detergent preferably has a viscosity of 2 to 500 mPa·s at 20° C. under uniform stirring. A detergent having a low viscosity less than 2 mPa·s may be difficult to retain in the base body. Further, such a low viscosity detergent is unfavorable for operation because it drips during use for cleaning a vertical plane, such as a window pane. A detergent having a viscosity exceeding 500 mPa·s, on the other hand, may be difficult to impregnate into the base body. Even if it is impregnated into the base body, it is hardly released therefrom on use. The viscosity is still preferably 10 to 100 mPa·s, particularly preferably 30 to 60 mPa·s. The viscosity of the detergent can be adjusted within the above range, for example, by addition of a prescribed amount of the thickening polysaccharide.

The detergent preferably has a pH of 3 to 12, particularly 5 to 10, especially 7 to 9, from the standpoint of detergency and low irritation to the skin. The pH of the detergent can be adjusted within this range by addition of a prescribed amount of a buffering agent, etc.

According to the detergent-impregnated article of the present invention, the following detergents may also be used. As can be seen in the Examples described below, the same advantageous effect as in the case of using the above-mentioned detergent can be obtained in the case of using these detergents.

A detergent-impregnated article comprising a base body and a detergent, wherein the base body is impregnated with the detergent comprising solid abrasive particles having an average particle size of 0.01 to 15 μm in a proportion of 0.1 to 30% by weight, the detergent having a viscosity of 2 to 500 mPa·s at 20° C. under stirring the detergent uniformly.

A detergent-impregnated article comprising a base body and a detergent, wherein the base body is impregnated with the detergent comprising 0.1 to 20% by weight of solid abrasive particles, 0.01 to 10% by weight of a thickening polysaccharide, 0.01 to 20% by weight of a surface active agent, and 50 to 99.88% by weight of water.

Details of these detergent-impregnated articles are not described specifically, but the detailed description in terms of the above-mentioned detergent-impregnated article can be applied to these degergent-impregnated articles without no limination.

It is preferable that the detergent be impregnated into a base body to an amount of 50 to 5000%, more preferably 100 to 3000, still more preferably 100 to 1000%, particularly 300 to 500%, by weight based on the weight of the base body with no load applied on the base body. If the amount of the detergent to be impregnated is less than 50% by weight, the amount of the detergent supplied to the surface to be cleaned by wiping is less than necessary. If it exceeds 5000% by weight, the detergent is supplied to the surface in excess.

The base body which can be used in the detergent-impregnated article of the present invention is flexible and capable of absorbing the above-described detergent, has sufficient strength while in use, and generates no loose fluff. A base body capable of absorbing the above-described amount of the detergent with no load applied thereon is particularly preferred. Base bodies having such performance include fibrous structures made of fibrous materials, such as paper of various kinds, nonwoven fabric, woven fabric and knitted fabric. Fibrous materials making up these fibrous structures include cellulose fibers, modified cellulose fibers, synthetic fibers, and mixtures of two or more thereof.

The cellulose fibers include natural fibers, such as wood pulp, cotton, and flax, and cellulosic chemical fibers, such as TENCEL™, viscose rayon, and acetates.

The synthetic fibers include polyolefin fibers such as polyethylene fiber and polypropylene fiber, polyester fibers such as polyethylene terephthalate fiber, polyamide fibers such as nylon fiber, polyacrylonitrile fiber, polyvinyl alcohol fiber, conjugate fibers comprising at least two kinds of these synthetic fibers, such as core-sheath type conjugate fibers, and mixed fibers comprising at least two kinds of these synthetic fibers.

A flexible porous structure such as a plastic foamed body, e.g., a spongy structure, is also useful as a base body. While not limiting, the porous structure can be a sheet, a column, a rectangular hexagon, etc.

It is preferable for the porous structure to have a larger cell size than the average particle size of the solid abrasive particles so that the solid abrasive particles may be easily taken up into the inside of the porous structure and be sufficiently supplied to a surface to be cleaned.

It is also preferable for the porous structure to have 10 to 100 cells/2.5 cm (the number of cells present across a 2.5 cm long straight line drawn on an arbitrary part of the porous structure is 10 to 100), particularly 30 to 50 cells/2.5 cm, from the standpoint of infiltration of the detergent into the porous structure, release and supply of a proper amount of the detergent from the porous structure to a surface to be cleaned.

Materials constituting the porous structure include cellulose resins, synthetic resins, and mixtures of two or more kinds thereof. The cellulose resins include viscous rayon and acetates. The synthetic resins include a polyolefin resin such as polyethylene and polypropylene, a polyester resin such as polyethylene terephthalate, a polyamide resin such as nylon, a polyacrylonitrile resin, a polyvinyl alcohol resin, and a urethane resin.

From the viewpoint of infiltration of the detergent into the base body and the feel on use and ease in operation of the detergent-impregnated article, paper, nonwoven fabric, woven fabric, knitted fabric, or a flexible porous structure (e.g., a spongy structure) is preferably used as a base body.

It is also preferable to use, as a base body, a sheet comprising a network sheet and a nonwoven fiber aggregate formed by the entanglement of fibers of a fiber web, disposed on at least one side of the network sheet, wherein the fibers of the nonwoven fiber aggregate are further entangled with the network sheet to form a unitary body.

It is preferable for the base body to have a basis weight of 15 to 400 $g/m^2$, more preferably 25 to 300 $g/m^2$, still more preferably 25 to 200 $g/m^2$, particularly 50 to 150 $g/m^2$, so as to secure infiltration of the detergent thereinto and the capacity for retaining a necessary amount of the detergent therein.

For easy operation and favorable feel on use of the detergent-impregnated article, the base body having a sheet form preferably has a thickness of 0.5 to 5 mm, more preferably 1 to 3 mm, with a load of 0.5 $g/cm^2$ applied thereon.

The detergent-impregnated article of the present invention is especially effective in cleaning a hard surface. When the detergent-impregnated article is used for cleaning a hard surface of, for example, glass, a motorcar body, mirror, tiles, furniture, etc., streaks are not left thereon after dry wiping so that there is no need to give another dry wipe. More specifically, a method for cleaning a hard surface with the detergent-impregnated article of the present invention is effective in cleaning inner or outer walls, floors, tatami (Japanese straw mat), ceilings, and roofs of a house, the wall, floor, door, bathtub, and other equipment (e.g., a basin) of a bathroom, the wall, floor, worktop counter around sinks and cookers, and ventilator of a kitchen, furniture, such as cupboards, drawers, tables, desks, chairs, and bookshelves, electric appliances, such as fridges, TV sets, personal computers, stereo sets, air conditioners, microwave ovens, washing machines, and lights, panes used in windows of houses or cars and doors of houses or cupboards, screen doors or window screens, the floor, wall, door, and stool of toilets, dishes and cooking tools, coated surfaces and plastic surfaces of cars, bicycles, motorbikes, etc., wheels of cars, exteriors, a porch, a terrace, a fence, a wall, and a gate of houses, and other general hard surfaces.

Impregnated with the detergent, the detergent-impregnated article of the present invention has a small dynamic friction coefficient on use and slides lightly on a surface to be cleaned. After the detergent-impregnated article is applied to a surface to be cleaned to release the dirt from the surface, the surface can be wiped up lightly with a wiping sheet (a sheet for dry wiping) with a reduced dynamic friction coefficient. Therefore, the dirt even on a large area can be removed with ease. When the dirt released from the surface by use of the detergent-impregnated article is wiped away with a wiping sheet, the dynamic friction coefficient in the dry wiping is preferably 1 or less, more preferably 0.5 or less, still more preferably 0.4 or less. Such a preferred dynamic friction coefficient is obtained by, for example, selecting the kind or concentration of every component mentioned above, and the amount of the impregnating detergent. The details for measurement of a dynamic friction coefficient will be described in detail in Examples hereinafter given. The wiping sheet to be used can be the same as the base body of the detergent-impregnated article.

After the dirt is released from a surface to be cleaned by application of the detergent-impregnated article and then wiped away by dry wiping with a wiping sheet, the thus cleaned surface has an extremely reduced static friction coefficient by the action of the protective layer formed by the protective layer-forming component. That is, the cleaned surface preferably has a static friction coefficient of 0 to 1.0, particularly 0 to 0.5. In practice, the advantageous effect of the present invention is sufficiently exhibited with a statistic friction coefficient of preferably 0. to 1.0, particularly 0.1 to 0.5. As a result, the cleaned surface will have a reduced dynamic friction coefficient and be wiped up more lightly even when it is necessary to give the cleaned surface another wipe with a wiping sheet, etc. Such a preferred static friction coefficient can be given to the cleaned surface by, for example, selecting the kind or concentration of the protective layer-forming component or the amount of the impregnating detergent. The details for measurement of a static friction coefficient will be described in detail in the Examples hereinbelow.

It is particularly preferable that, when the detergent-impregnated article is applied to the surface of a flat and transparent soda-lime glass plate (i.e., a hard surface) and then dirt and the detergent present on the surface are wiped off with a wiping sheet, the cleaned surface have a static friction coefficient of 0 to 1.0.

Dirt can be released from a surface to be cleaned simply by giving a light wipe with the detergent-impregnated article of the present invention. Therefore, surfaces even in a high position that are difficult to wipe up can easily be cleaned by using the detergent-impregnated article (especially a sheet article) and/or a wiping sheet attached to a head 2 of a cleaning apparatus 1 as shown in FIG. 1.

The cleaning apparatus 1 shown in FIG. 1 is composed of a flat head 2 to which a detergent-impregnated article (especially a sheet article) 10 can be fitted and a stick 4 connected to the head 2 via a universal joint 3. The detergent-impregnated article 10 is fixed to the head 2 by means of a plurality of flexible parts 5 each having radial slits.

Figure 2:
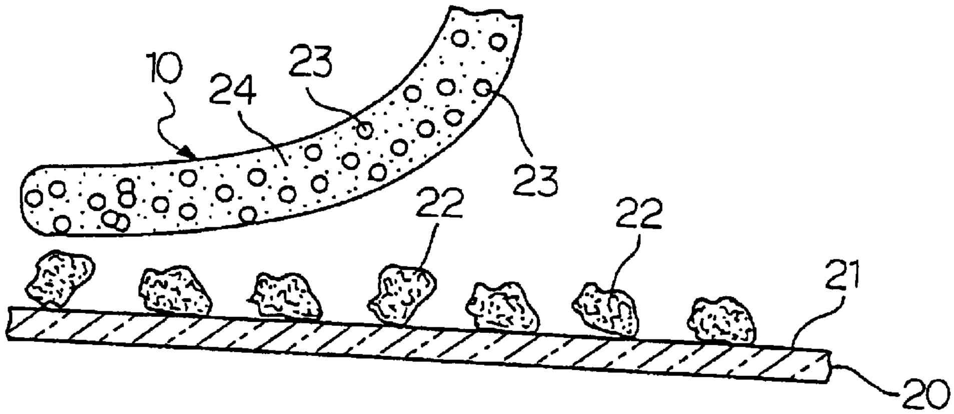
Figure 2B:
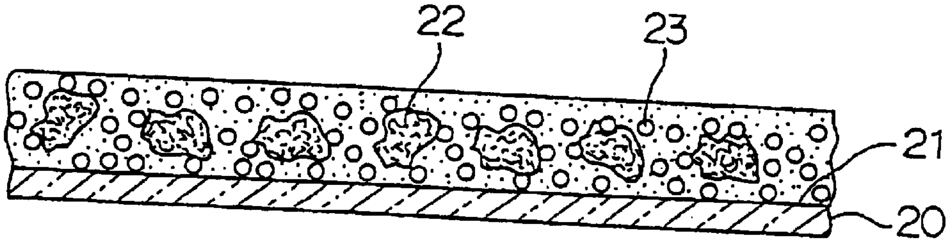
Figure 2C:
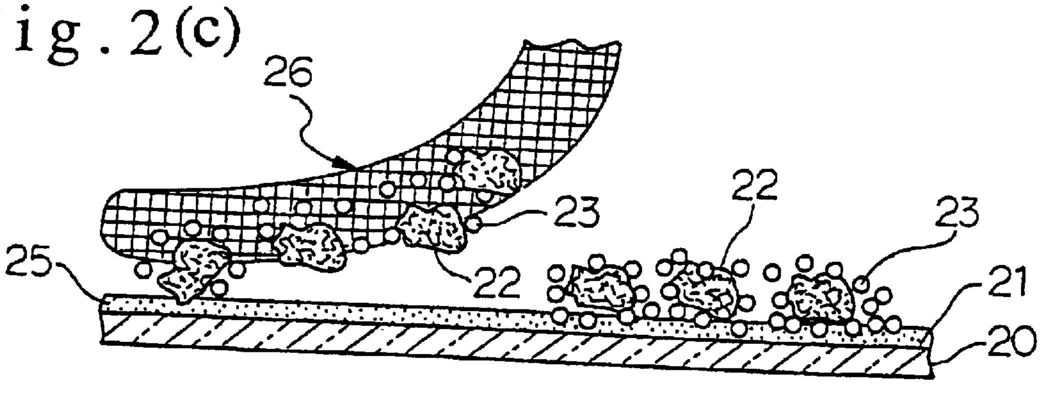

The cleaning method using the detergent-impregnated article of the present invention will be described with reference to the example of cleaning glass surface. Reference is made to FIG. 2. FIG. 2 schematically illustrates an embodiment of the cleaning method, in which a detergent-impregnated sheet as the detergent-impregnated article of the present invention is used for cleaning glass.

The cleaning method of the present invention comprises wiping the surface of a hard surface to be cleaned with the detergent-impregnated article according to the present invention to supply the detergent to the surface and to release dirt from the surface and then wiping the surface with a wiping sheet to remove the thus released dirt and the detergent and to form a stain-resistant protective layer on the surface.

More particularly, the greatest characteristic of the cleaning method consists in that the surface of glass can be cleaned with the detergent-impregnated article alone without using a large amount of water or any other detergent. That is, in cleaning glass, the surface 21 of glass 20 to be cleaned is directly wiped with the detergent-impregnated article 10 to supply the detergent to the surface as shown in FIG. 2(*a*), whereby, as shown in FIG. 2(*b*), a dirt component 22 present on the surface 21 mixes with the solid abrasive particles 23 in the detergent and is thus released from the surface 21 in a powdered form. While not shown, oily stains mix with the organic solvent, such as n-paraffin, that is added to the detergent if desired, and are thus released from the surface 21. At the same time, the protective layer-forming component 24 of the detergent coats the surface 21.

After about 30 seconds to 5 minutes, the released powdered dirt component 22 is dry wiped off with a wiping sheet 26 of paper or nonwoven fabric such as dry cloth, tissue or kitchen towel, as shown in FIG. 2(9*c*). Being in a powdered state, the dirt component can be wiped away easily, without leaving streaks. On the surface thus cleaned there remains a protective layer 25 made of the protective layer-forming component 24, which exhibits stain resistance, so that the resulting cleaned surface may be resistant against staining and may be cleaned more easily the next time.

EXAMPLES

The present invention will now be illustrated in greater detail, but it should be understood that the present invention is not construed as being limited thereto. Unless otherwise noted, all the percents are given by weight.

Example 1

Formulation of Detergent

A detergent was prepared according to the following formulation.

| | |
|---|---|
| Silicone powder (solid abrasive particles) (average particle size: 2 μm) | 3% |
| Dimethylpolysiloxane (protective layer-forming component) | 0.5% |
| n-Paraffin (organic solvent) | 2% |
| Dodecyl glucoside (nonionic surface active agent; degree of glucose condensation: 1.35) | 0.50% |
| Xanthan gum (dispersant) | 0.13% |
| Ethanol (drying accelerator) | 20% |
| Deionized water | balance |

The resulting detergent has an increased rate of drying owing to ethanol.

Preparation of Detergent-impregnated Article

A pulp sheet having a basis weight of 55 g/m$^2$ and a thickness of 0.9 mm under a load of 0.5 g/cm$^2$ which was prepared in a dry process comprising adhering scattered and laid fibers with an binder into sheeting (hereinafter referred to as a pulp sheet by dry process; available from HAVIX) was immersed in the detergent. After thorough impregnation with the detergent, the pulp sheet by dry process was taken up and squeezed through a mangle to remove excess of the detergent. The resulting detergent-impregnated article had a detergent absorption of 300 to 500% based on the weight of the pulp sheet by dry process.

The detergent performance of the detergent-impregnated sheet was examined as follows. A flat and transparent soda-lime glass plate for evaluation which had been thoroughly cleaned by washing with water was allowed to stand in a north side of a building and kept out of rain for 3 months. The surface of the glass was wiped up with the detergent-impregnated article. After drying, the surface was dry wiped with kitchen towel produced by HAVIX (the same as the above-described pulp sheet by dry process). The dynamic friction coefficient in this dry wiping was measured in accordance with the method described below. The surface of the glass surface after dry wiping with kitchen towel was observed to evaluate degree of streaks based on the following rating system. The static friction coefficient of the glass surface after dry wiping was measured according to the method described below. In addition, the evaluation on stain resistance of the glass surface after dry wiping was measured according to the method described below. The results obtained are shown in Table 1 below.

(Measurement of Dynamic Friction Coefficient)

The glass for evaluation having been allowed to stand under the above-described conditions for 3 months was wiped with the detergent-impregnated article to uniformly supply 3 g/m$^2$ of the detergent. After the detergent dried (about 3 minutes later), a sheet of kitchen towel produced by HAVIX (pulp sheet by dry process), cut into a disk of 6 cm in diameter, was placed thereon and slid horizontally at a speed of 3 cm/sec under a load of 1.3 kg. The force F required for the sliding was measured to obtain a dynamic friction coefficient according to equation (1):

$$\textit{Dynamic friction coefficient} = F(\text{kg weight})/1.3(\text{kg weight}) \quad (1)$$

If the dynamic friction coefficient in wiping is 0.4 or higher, a wiping sheet hardly slides over the surface.

(Evaluation on Degree of Streaks)

A reduction in gloss due to streaks left on the surface was made use of. The gloss of the cleaned glass surface was measured at 85° with a glossimeter (9M-268 manufactured by Minolta). The greater the measured gloss, the lesser the degree of the streaks left on the surface. At a gloss of 110 or less, the streaks are observable with the naked eye. The initial gloss of the surface before standing outdoors (i.e., the fresh clean surface) was 115.

(Measurement of Static Friction Coefficient)

The static friction coefficient of the cleaned glass surface was measured with a friction meter (HEIDON Tribo gear $\mu$s Type 94i manufactured by Shinto Kagaku K. K.), with a sheet of kitchen towel (a pulp sheet by dry process, produced by HAVIX) being set on the measuring part thereof. An average of the measured values (n=5) was obtained.

The static friction coefficient of the glass plate after standing under the above-described conditions for 3 months was 1.45, and that before standing.(i.e., the fresh clean surface) was 0.52. Somewhat varying depending on the weather during the standing period and the surface conditions of the glass, these values should be taken as guides to evaluation.

(Evaluation on Stain Resistance)

After standing under the above conditions for 3 months, the glass for evaluation was wiped up with the detergent-impregnated article. Then the detergent on the surface was wiped off with kitchen towel (pulp sheet by dry process, produced by HAVIX) to prepare a surface for evaluation. In Comparative Example 3, a liquid detergent was sprayed onto the glass surface and then dry wiped with the kitchen towel.

The static friction coefficient (A) of the surface for evaluation was measured immediately after the preparation according to the above method. After the measurement, the glass was again allowed to stand under the same conditions for 3 months, and the static friction coefficient (B) was again measured.

For control, the same glass as that for evaluation was allowed to stand under the same conditions for 3 months and thoroughly washed with water to prepare a control surface. The static friction coefficient (C) of the control surface (≈0.52) was measured in the same manner as described above. The glass for control was again allowed to stand under the same conditions for 3 months, and the static friction coefficient (D) (≈1.45) was measured in the same manner as described above.

The degree of staining was calculated from the measured values A, B, C, and D according to equation (2). Degrees of staining of 30% or less, preferably 20% or less, indicate that the stain resistance can be confirmed visually.

$$\text{Degree of Staining (\%)} = \frac{B-A}{D-C} \times 100 \quad (2)$$

Example 2

A detergent was prepared according to the following formulation. A detergent-impregnated article was prepared using the detergent in the same manner as in Example 1. The resulting detergent-impregnated article was subjected to measurement and evaluation in the same manner as in Example 1. The results obtained are shown in Table 1.

Detergent Formulation

| | |
|---|---|
| Silicone powder (solid abrasive particles) (average particle size: 2 $\mu$m) | 5% |
| Dimethylpolysiloxane (protective layer-forming component) | 1% |
| n-Paraffin (organic solvent) | 7% |
| Dodecyl glucoside (nonionic surface active agent; degree of glucose condensation: 1.35) | 0.50% |
| Xanthan gum (dispersant) | 0.13% |
| Deionized water | balance |

Comparative Examples 1 and 2

A detergent was prepared in the same manner as in Example 1, except that the silicone powder was not used (Comparative Example 1) or the dimethylpolysiloxane was not used (Comparative Example 2). A detergent-impregnated article was prepared using the detergent in the same manner as in Example 1. The resulting detergent-impregnated article was subjected to measurement and evaluation in the same manner as in Example 1. The results obtained are shown in Table 1.

Comparative Example 3

A commercial liquid detergent for glass (Glass Mypet produced by Kao Corp.) was sprayed onto the same glass as used in Example 1 in an amount of 6 g/m$^2$. The sprayed surface was wiped with wet cloth and then with kitchen towel (a pulp sheet by dry process; available from HAVIX). The degree of the streaks were evaluated after the dry wiping, and the static friction coefficient and stain resistance of the glass surface were measured in the same manner as in Example 1. The results obtained are shown in Table 1.

TABLE 1

| | Dynamic Friction Coefficient in Wiping | Degree of Streaks (Gloss) | Static Friction Coefficient of Cleaned Surface | Degree of Staining (%) |
|---|---|---|---|---|
| Example 1 | 0.20 | 114 | 0.25 | 17 |
| Example 2 | 0.20 | 112 | 0.25 | 18 |
| Comparative Example 1 | 0.50 | 110 | 0.30 | 21 |
| Comparative Example 2 | 0.20 | 114 | 0.58 | 93 |
| Comparative Example 3 | 0.50 | 100 | 0.60 | 91 |

Example 3

A detergent was prepared in the same manner as in Example 1, except for replacing the silicone powder with the solid abrasive particles shown in Table 2 below. A detergent-impregnated article was prepared using the detergent in the same manner as in Example 1. The resulting detergent-impregnated article was subjected to measurement and evaluation in the same manner as in Example 1. The results obtained are shown in Table 2.

TABLE 2

| Solid Abrasive Grains | Dynamic Friction Coefficient in Wiping | Degree of Streaks (gloss) | Static Friction Coefficient of Cleaned Surface | Degree of Staining (%) |
|---|---|---|---|---|
| Polymethacrylate | 0.30 | 112 | 0.34 | 17 |
| Polyethylene | 0.30 | 112 | 0.35 | 17 |
| Polypropylene | 0.30 | 112 | 0.35 | 14 |
| Polystyrene | 0.30 | 112 | 0.35 | 14 |
| Nylon | 0.30 | 112 | 0.35 | 17 |
| Silica | 0.35 | 112 | 0.38 | 14 |
| Porous Silica | 0.35 | 112 | 0.37 | 15 |
| Magnesium Oxide | 0.35 | 112 | 0.37 | 16 |
| Titanium Oxide | 0.35 | 112 | 0.35 | 17 |
| Silicon Carbide | 0.35 | 112 | 0.35 | 18 |
| Calcium carbonate | 0.35 | 112 | 0.39 | 13 |
| Calcium Phosphate | 0.35 | 112 | 0.38 | 13 |
| Chromium Oxide | 0.35 | 112 | 0.39 | 12 |
| Emery | 0.35 | 112 | 0.38 | 14 |
| Aluminosilicate | 0.35 | 112 | 0.37 | 16 |
| Quartz Sand | 0.35 | 112 | 0.36 | 17 |
| Dolomite | 0.35 | 112 | 0.35 | 18 |
| Mica Powder | 0.35 | 112 | 0.35 | 18 |
| Siliceous Stone | 0.35 | 112 | 0.36 | 14 |
| Diatomaccous Earth | 0.35 | 112 | 0.36 | 15 |
| Kaolinite | 0.20 | 114 | 0.25 | 17 |
| Halloysite | 0.35 | 112 | 0.39 | 13 |
| Illite | 0.35 | 112 | 0.37 | 15 |
| Vermiculite | 0.35 | 112 | 0.38 | 14 |
| Sodium Silicates | 0.35 | 112 | 0.33 | 14 |
| Glass Powder | | | | |
| Sheet Silicate | 0.35 | 112 | 0.39 | 13 |
| Hectorite | 0.35 | 112 | 0.36 | 15 |
| Chitin Powder | 0.35 | 112 | 0.36 | 16 |
| Chitosan Powder | 0.35 | 112 | 0.39 | 13 |
| Hydroxyapatite | 0.35 | 112 | 0.38 | 14 |
| Bentonite | 0.20 | 114 | 0.25 | 18 |
| Montmorillonite | 0.20 | 114 | 0.25 | 18 |

As is apparent from the results in Tables 1 and 2, the detergent-impregnated articles of the present invention comprising a base body impregnated with a detergent containing solid abrasive particles and a protective layer-forming component (Examples 1 to 3), when used for cleaning the surface of glass, give a smaller dynamic friction coefficient in dry wiping and leave no streaks as compared with the detergent-impregnated articles of Comparative Examples 1 to 3. It is also seen that the surface cleaned with the detergent-impregnated articles of the present invention and dry wiped has a smaller static friction coefficient than that of the clean surface (0.52) by the action of the protective layer and exhibits excellent stain resistance.

Cleaning of glass with a conventional liquid detergent for glass (Comparative Example 3) results in considerable streaks left on the surface as compared with the results of Examples 1 to 3.

Example 4

Formulation of Detergent

A detergent was prepared according to the following formulation.

| | |
|---|---|
| Spherical solid abrasive particles (see Tables 3 through 6 below) | 3% |
| Dimethylpolysiloxane (protective layer-forming component) | 0.5% |
| n-Paraffin (b.p.: 227° C.) (organic solvent) | 2% |
| Dodecyl glucoside (nonionic surface active agent; degree of glucose condensation: 1.35) | 0.50% |
| Xanthan gum (dispersant) | 0.13% |
| Ethanol (drying accelerator) | 20% |
| Deionized water | balance |

Of the particles shown in Tables 3 to 6, 90% or more, in number, of spherical solid abrasive particles had a projected image of a true circle. The projected image and surface energy of the spherical solid abrasive particles were obtained in accordance with the following methods.

(Spherical Solid Abrasive Particles)

A projected image of the particles was obtained by means of an image analyzer (TV Image Processor EXCEL TVIP-4100, manufactured by Nippon Avionics Co., Ltd.) equipped with a stereoscopic microscope (Hiscope KA-2200, manufactured by HIROX).

(Measurement of Surface Energy of Spherical Solid Abrasive Particles)

A sample of the particles (a freeze-dried sample in the case of an emulsuion) was compressed into a tablet nearly with a mirror surface by means of a tabletting machine under a pressure of 300 to 1,000 kg/cm$^2$. The contact angle of water and diodomethane with that surface was measured to determine the surface energy of the particles.

TABLE 3

| Formulation No. | Material | Average Particle Size (μm) | Surface Energy (mN/m) | True Specific Gravity | Viscosity of Detergent (20° C.) (mPa · s) |
|---|---|---|---|---|---|
| 1 | Polyethylene | 3 | 33 | 0.98 | 45 |
| 2 | | 0.01 | | | |
| 3 | | 0.1 | | | |
| 4 | | 0.5 | | | |
| 5 | Polystyrene | 2 | 35 | 1.05 | 46 |
| 6 | | 4 | | | |
| 7 | | 10 | | | |
| 8 | Polyvinyl chloride | 3 | 39 | 1.38 | 44 |

TABLE 4

| Formulation No. | Material | Average Particle Size (μm) | Surface Energy (mN/m) | True Specific Gravity | Detergent Viscosity (20° C.) (mPa · s) |
|---|---|---|---|---|---|
| 9 | Acrylic ester/Acrylic | 0.01 | 40 | 1.10 | 46 |
| 10 | acid/Methacrylic ester/ | 0.1 | | | |
| 11 | Methacrylic acid/ | 0.5 | | | |
| 12 | Styrene Copolymer | 2 | | | |
| 13 | | 4 | | | |
| 14 | | 10 | | | |
| 15 | Crosslinked acrylic ester/Acrylic acid/ Methacrylic ester/ Methacrylic acid/ Styrene Copolymer | 3 | 41 | 1.15 | 47 |

TABLE 5

| Formulation No. | Material | Average Particle Size (μm) | Surface Energy (mN/m) | True Specific Gravity | Detergent Viscosity (20° C.) (mPa · s) |
|---|---|---|---|---|---|
| 16 | Crosslinked polymethacrylic ester | 3 | 39 | 1.21 | 45 |
| 17 | Urethane resin | 3 | 45 | 1.21 | 48 |
| 18 | Dimethylpolysiloxane of high polymerization degree (silicone rubber) | 3 | 25 | 0.97 | 48 |
| 19 | Silicone resin | 3 | 30 | 1.30 | 46 |
| 20 | Organopoly-silsesquioxane | 3 | 28 | 1.30 | 47 |

TABLE 6

| Formulation No. | Material | Average Particle Size (μm) | Surface Energy (mN/n) | True Specific Gravity | Detergent Viscosity (20° C.) (mPa · s) |
|---|---|---|---|---|---|
| 21 | Polyacetal | 3 | 42 | 1.18 | 45 |
| 22 | Polycarbonate | 3 | 43 | 1.19 | 43 |
| 23 | Silica | 3 | 76 | 2.30 | 45 |
| 24 | Porous silica | 3 | 76 | 2.00 | 45 |

A detergent-impregnated article was prepared using the detergent in the same manner as in Example 1. The resulting detergent-impregnated article was subjected to measurement and evaluation in the same manner as in Example 1. The results obtained are shown in Tables 7 through 10.

TABLE 7

| Formulation No. | Dynamic Friction in Coefficient Wiping | Degree of Streaks (gloss) | Static Friction Coefficient of Cleaned Surface | Degree of Staining (%) |
|---|---|---|---|---|
| 1 | 0.33 | 112 | 0.35 | 17 |
| 2 | 0.38 | 112 | 0.35 | 14 |
| 3 | 0.32 | 112 | 0.35 | 14 |
| 4 | 0.31 | 112 | 0.35 | 14 |
| 5 | 0.30 | 112 | 0.35 | 14 |
| 6 | 0.30 | 112 | 0.35 | 14 |
| 7 | 0.38 | 112 | 0.35 | 14 |
| 8 | 0.33 | 112 | 0.35 | 17 |

TABLE 8

| Formulation No. | Dynamic Friction in Coefficient Wiping | Degree of Streaks (gloss) | Static Friction Coefficient of Cleaned Surface | Degree of Staining (%) |
|---|---|---|---|---|
| 9 | 0.39 | 112 | 0.36 | 17 |
| 10 | 0.35 | 112 | 0.35 | 17 |
| 11 | 0.33 | 112 | 0.35 | 17 |
| 12 | 0.31 | 112 | 0.35 | 17 |
| 13 | 0.32 | 112 | 0.35 | 17 |
| 14 | 0.37 | 112 | 0.35 | 17 |
| 15 | 0.30 | 112 | 0.35 | 17 |

TABLE 9

| Formulation No. | Dynamic Friction in Coefficient Wiping | Degree of Streaks (gloss) | Static Friction Coefficient of Cleaned Surface | Degree of Staining (%) |
|---|---|---|---|---|
| 16 | 0.30 | 112 | 0.35 | 15 |
| 17 | 0.34 | 112 | 0.35 | 16 |
| 18 | 0.35 | 113 | 0.30 | 17 |
| 19 | 0.20 | 114 | 0.25 | 17 |
| 20 | 0.20 | 114 | 0.25 | 17 |

TABLE 10

| Formulation No. | Dynamic Friction in Coefficient Wiping | Degree of Streaks (gloss) | Static Friction Coefficient of Cleaned Surface | Degree of Staining (%) |
|---|---|---|---|---|
| 21 | 0.35 | 112 | 0.35 | 18 |
| 22 | 0.33 | 112 | 0.35 | 17 |
| 23 | 0.35 | 112 | 0.40 | 14 |
| 24 | 0.35 | 112 | 0.37 | 15 |

Example 5

A detergent was prepared in the same manner as in Example 4, except for using spherical solid abrasive particles made of silicone resin (average particle size: 3 μm; surface energy: 30 mN/m; true specific gravity: 1.3; 90% or more, in number, of the particles had a true circle projected image) and the protective layer-forming component shown in Table 11 below. A detergent-impregnated article was prepared using the detergent in the same manner as in Example 4. The resulting detergent-impregnated article was subjected to measurement and evaluation in the same manner as in Example 1. The results obtained are shown in Table 11.

TABLE 11

| Organopoly-siloxane | Viscosity of Detergent (20° C.) (mPa · s) | Dynamic Friction Coefficient in Wiping | Degree of Streaks (gloss) | Static Friction Coefficient on Cleaned Surface | Degree of Staining (%) |
|---|---|---|---|---|---|
| Methyl-phenyl silicone oil | 45 | 0.22 | 112 | 0.25 | 18 |

TABLE 11-continued

| Organopolysiloxane | Viscosity of Detergent (20° C.) (mPa · s) | Dynamic Friction Coefficient in Wiping | Degree of Streaks (gloss) | Static Friction Coefficient on Cleaned Surface | Degree of Staining (%) |
|---|---|---|---|---|---|
| Methyl-hydrogen silicone oil | 47 | 0.23 | 112 | 0.25 | 17 |
| Fluorine-modified silicone oil | 46 | 0.20 | 112 | 0.25 | 16 |
| Amino-modified silicone oil | 48 | 0.35 | 112 | 0.35 | 13 |
| Alcohol-modified silicone oil | 46 | 0.22 | 112 | 0.25 | 18 |
| Alkyl-modified silicone oil | 44 | 0.24 | 112 | 0.25 | 17 |

Example 6

A detergent was prepared in the same manner as in Example 4, except for using spherical solid abrasive particles made of silicone resin (average particle size: 3 μm; surface energy: 30 mN/m; true specific gravity: 1.3; shape: true spheres) and the organic solvent shown in Table 12 below. A detergent-impregnated article was prepared using the detergent in the same manner as in Example 4. The resulting detergent-impregnated article was subjected to measurement and evaluation in the same manner as in Example 1. The results obtained are shown in Table 12.

TABLE 12

| Organic Solvent (b.p.) | Viscosity of Detergent (20° C.) (mPa.s) | Dynamic Friction Coefficient in Wiping | Degree of Streaks (gloss) | Static Friction Coefficient on Cleaned Surface | Degree of Staining (%) |
|---|---|---|---|---|---|
| Kerosine (b.p. 235° C.) | 42 | 0.23 | 113 | 0.25 | 17 |
| Petroleum Benzine (b.p. 90° C.) | 41 | 0.21 | 113 | 0.25 | 18 |
| Cyclohexane (b.p. 81° C.) | 44 | 0.22 | 113 | 0.25 | 19 |
| Xylene (b.p. 140° C.) | 42 | 0.24 | 113 | 0.25 | 17 |
| n-Hexane (b.p. 69° C.) | 43 | 0.20 | 113 | 0.25 | 18 |

As is apparent from the results in Tables 7 through 12, the detergent-impregnated articles of the present invention, when used for cleaning the surface of glass, give a smaller dynamic friction coefficient in dry wiping and leave no streaks. It is also seen that the surface cleaned with the detergent-impregnated articles of the present invention and dry wiped has a smaller static friction coefficient than that of the clean surface (0.52) by the action of the protective layer and exhibits excellent stain resistance.

Example 7

A detergent was prepared according to the following formulation.

| | |
|---|---|
| Formulation (1) | |
| Silicone resin (solid abrasive particles) (average particle size: 3 μm; true specific gravity: 1.3) | 3% |
| Dimethylpolysiloxane (protective layer-forming component) | 0.5% |
| n-Paraffin (b.p.: 227° C.) (organic solvent) | 3.5% |
| Dodecyl glucoside (surface active agent; degree of glucose condensation: 1.35) | 0.50% |
| Thickening polysaccharide (see Table 13) | 0.1% |
| Ethanol (drying accelerator) | 20% |
| Deionized water | balance |
| Formulation (2) | |
| Silicone resin (solid abrasive particles) (average particle size: 3μm; true specific gravity: 1.3) | 6% |
| Dimethylpolysiloxane (protective layer-forming component) | 1% |
| n-Paraffin (b.p.: 227° C.) (organic solvent) | 7% |
| Dodecyl glucoside (surface active agent; degree of glucose condensation: 1.35) | 1.0% |
| Thickening polysaccharide (see Table 14) | 0.2% |
| Deionized water | balance |

A detergent-impregnated article was prepared using the detergent in the same manner as in Example 1. The resulting detergent-impregnated article was horizontally put in a closed container and allowed to stand at 40° C. for 6 weeks. The detergent performance of the upper side of the thus stored article was examined in the same manner as in Example 1. The detergent performance of the article before the standing was also examined. The results obtained are shown in Tables 13 and 14.

TABLE 13

| Formulation (1) | Thickening Polysaccharide | Detergent Viscosity (20° C.) (mPa.s) | Detergent pH | Dynamic Friction Coefficient in Wiping Before Storage/After Storage | Degree of Streaks (gloss) Before Storage/After Storage | Static Friction Coefficient on Cleaned Surface Before Storage/After Storage |
|---|---|---|---|---|---|---|
| 1 | Xanthan gum | 46 | 8.5 | 0.20/0.22 | 114/114 | 0.25/0.27 |
| 2 | Gellan gum | 50 | 8.5 | 0.20/0.22 | 114/114 | 0.25/0.27 |
| 3 | Welan gum | 50 | 8.0 | 0.20/0.22 | 114/114 | 0.25/0.27 |
| 4 | Rhamsan gum | 55 | 8.5 | 0.20/0.22 | 114/114 | 0.25/0.27 |
| 5 | Guar gum | 55 | 8.0 | 0.20/0.22 | 114/114 | 0.25/0.27 |

TABLE 13-continued

| Formulation (1) | Thickening Polysaccharide | Detergent Viscosity (20° C.) (mPa.s) | Detergent pH | Dynamic Friction Coefficient in Wiping Before Storage/After Storage | Degree of Streaks (gloss) Before Storage/After Storage | Static Friction Coefficient on Cleaned Surface Before Storage/After Storage |
|---|---|---|---|---|---|---|
| 6 | Hydroxypropylated guar gum | 60 | 7.5 | 0.25/0.27 | 113/113 | 0.30/0.32 |
| 7 | Carboxymethyl-hydroxypropylated guar gum | 65 | 7.5 | 0.25/0.27 | 113/113 | 0.30/0.32 |
| 8 | Cationized guar gum | 55 | 8.0 | 0.20/0.22 | 114/114 | 0.25/0.27 |
| 9 | Sodium alginate | 66 | 8.0 | 0.25/0.27 | 113/113 | 0.30/0.32 |
| 10 | Pectin | 65 | 8.5 | 0.25/0.27 | 113/113 | 0.30/0.32 |
| 11 | Carrageenan | 67 | 8.5 | 0.25/0.27 | 113/113 | 0.30/0.32 |
| 12 | Locust bean gum | 65 | 7.5 | 0.25/0.27 | 113/113 | 0.30/0.32 |
| 13 | Tara gum | 70 | 8.5 | 0.30/0.32 | 112/112 | 0.35/0.37 |
| 14 | Pullulan | 75 | 8.0 | 0.30/0.32 | 112/112 | 0.35/0.37 |
| 15 | Sodium hyaluronate | 73 | 8.0 | 0.30/0.32 | 112/112 | 0.35/0.37 |
| 16 | Hydroxyethyl cellulose | 80 | 7.5 | 0.35/0.37 | 112/112 | 0.40/0.42 |
| 17 | Sodium carboxymethyl cellulose | 85 | 7.5 | 0.35/0.37 | 112/112 | 0.40/0.42 |

TABLE 14

| Formulation (1) | Thickening Polysaccharide | Detergent Viscosity (20° C.) (mPa.s) | Detergent pH | Dynamic Friction Coefficient in Wiping Before Storage/After Storage | Degree of Streaks (gloss) Before Storage/After Storage | Static Friction Coefficient on Cleaned Surface Before Storage/After Storage |
|---|---|---|---|---|---|---|
| 1 | Xanthan gum | 92 | 8.5 | 0.20/0.22 | 112/112 | 0.25/0.28 |
| 2 | Gellan gum | 100 | 8.5 | 0.20/0.23 | 112/112 | 0.25/0.28 |
| 3 | Welan gum | 100 | 8.0 | 0.20/0.23 | 112/112 | 0.25/0.28 |
| 4 | Rhamsan gum | 110 | 8.5 | 0.20/0.23 | 112/112 | 0.25/0.28 |
| 5 | Guar gum | 110 | 8.0 | 0.20/0.23 | 112/112 | 0.25/0.28 |
| 6 | Hydroxypropylated guar gum | 120 | 7.5 | 0.25/0.28 | 112/112 | 0.30/0.33 |
| 7 | Carboxymethyl-hydroxypropylated guar gum | 130 | 7.5 | 0.25/0.28 | 112/112 | 0.30/0.33 |
| 8 | Cationized guar gum | 110 | 8.0 | 0.20/0.23 | 112/112 | 0.25/0.28 |
| 9 | Sodium alginate | 132 | 8.0 | 0.25/0.28 | 112/112 | 0.30/0.33 |
| 10 | Pectin | 130 | 8.5 | 0.25/0.28 | 112/112 | 0.30/0.33 |
| 11 | Carrageenan | 134 | 8.5 | 0.25/0.28 | 112/112 | 0.30/0.33 |
| 12 | Locust bean gum | 130 | 7.5 | 0.25/0.28 | 112/112 | 0.30/0.33 |
| 13 | Tara gum | 140 | 8.5 | 0.30/0.33 | 112/112 | 0.35/0.38 |
| 14 | Pullulan | 150 | 8.0 | 0.30/0.33 | 112/112 | 0.35/0.38 |
| 15 | Sodium hyaluronate | 146 | 8.0 | 0.30/0.33 | 112/112 | 0.35/0.38 |
| 16 | Hydroxyethyl cellulose | 160 | 7.5 | 0.35/0.38 | 112/112 | 0.40/0.43 |
| 17 | Sodium carboxymethyl cellulose | 170 | 7.5 | 0.35/0.38 | 112/112 | 0.40/0.43 |

Example 8

A detergent was pared according to the following formulation. A detergent-impregnated article was prepared using the detergent in the same manner as in Example 1. The resulting detergent-impregnated article was subjected to measurement and evaluation in the same manner as in Example 7. The results obtained are shown in Table 15.

| | |
|---|---|
| Solid abrasive particles (see Table 15) | 3% |
| Dimethylpolysiloxane (protective layer-forming component) | 0.5% |

-continued

| | |
|---|---|
| n-Paraffin (b.p.: 227° C.) (organic solvent) | 2% |
| Dodecyl glucoside (surface active agent) (degree of glucose condensation: 1.35) | 0.5% |
| Xanthan gum (thickening polysaccharide) | 0.15% |
| Ethanol (drying accelerator) | 20% |
| Deionized water balance | balance |

TABLE 15

| | Shape | Material | Average Particle Size (μm) | True Specific Gravity | Detergent Viscosity (20° C.) (mPa · s) | Detergent pH | Dynamic Friction Coefficient in Wiping Before Storage/After Storage | Degree of Streaks (gloss) Before Storage/After Storage | Static Friction Coefficient on Cleaned Surface Before Storage/After Storage |
|---|---|---|---|---|---|---|---|---|---|
| 1 | Spherical | Polyethylene | 3 | 0.98 | 69 | 8.5 | 0.33/0.33 | 112/112 | 0.35/0.35 |
| 2 | Spherical | Polyvinyl chloride | 3 | 1.38 | 55 | 8.5 | 0.33/0.33 | 112/112 | 0.35/0.35 |
| 3 | Spherical | Polyester | 3 | 1.38 | 69 | 8.5 | 0.31/0.31 | 112/112 | 0.35/0.35 |
| 4 | Spherical | Dimethylpolysiloxane of high degree of polymerization (silicone rubber) | 3 | 0.97 | 60 | 8.5 | 0.35/0.35 | 113/113 | 0.30/0.30 |
| 5 | Spherical | Polystyrene | 2 | 1.05 | 75 | 8.5 | 0.30/0.30 | 112/112 | 0.35/0.35 |
| 6 | Spherical | Acrylic ester/Acrylic acid/Methacrylic ester/Methacrylic acid/Styrene Copolymer | 4 | 1.10 | 69 | 8.5 | 0.31/0.31 | 112/112 | 0.35/0.35 |
| 7 | Spherical | Crosslinked Acrylic ester/Acrylic acid/Methacrylic ester/Methacrylic acid/Styrene Copolymer | 3 | 1.15 | 55 | 8.5 | 0.30/0.30 | 112/112 | 0.35/0.35 |
| 8 | Spherical | Crosslinked polymethacrylic ester | 3 | 1.21 | 69 | 8.5 | 0.30/0.30 | 112/112 | 0.35/0.35 |
| 9 | Spherical | Urethane resin | 3 | 1.21 | 60 | 8.5 | 0.34/0.34 | 112/112 | 0.35/0.35 |
| 10 | Spherical | Organopolysilsesquioxane | 3 | 1.30 | 69 | 8.5 | 0.20/0.20 | 114/114 | 0.25/0.25 |
| 11 | Spherical | Polyacetal | 3 | 1.18 | 60 | 8.5 | 0.35/0.35 | 112/112 | 0.35/0.35 |
| 12 | Spherical | Polycarbonate | 3 | 1.19 | 69 | 8.5 | 0.33/0.33 | 112/112 | 0.35/0.35 |
| 13 | Amorphous | Silica | 3 | 2.20 | 75 | 8.5 | 0.35/0.35 | 112/112 | 0.40/0.40 |
| 14 | Spherical | Porous silica | 3 | 2.00 | 69 | 8.5 | 0.35/0.35 | 112/112 | 0.41/0.41 |
| 15 | Amorphous | Silicone resin | 3 | 1.30 | 69 | 8.5 | 0.20/0.20 | 115/115 | 0.25/0.25 |

As is apparent from the results in Tables 13 through 15, even when the detergent-impregnated article of the present invention is stored for a long time of period, the solid abrasive particles can be retained stably in the base body by incorporating into the detergent a specific thickening polysaccharide in a specific concentration. Therefore, the article undergoes no change in detergency with time when stored.

Further, the detergent-impregnated article gives a smaller dynamic friction coefficient in dry wiping and leave no streaks. It is also seen that the surface cleaned with the detergent-impregnated article of the present invention and dry wiped has a smaller static friction coefficient than that of the clean surface (0.52) by the action of the protective layer.

Industrial Applicability

The detergent-impregnated article according to the present invention makes dirt removable by a light wipe without using water and leaves no streaks on the surface after dry wiping and therefore excludes the necessity of giving another wipe.

Further, the detergent-impregnated article of the present invention imparts excellent stain resistance to the surface after dry wiping.

Furthermore, the detergent-impregnated article of the present invention is capable of wiping off dirt from a large area with ease.

According to the detergent-impregnated article of the present invention, solid abrasive particles are maintained in a stably dispersed state in the base body without being localized, settled or floated even after long-term storage. Therefore, the workability in cleaning is not impaired, and excellent detergent performance is exhibited.

What is claimed is:

1. A method for cleaning a hard surface comprising the steps of:

providing a detergent-impregnated article comprising a base body and a detergent impregnated in said base body wherein said detergent-impregnated article contains 50 to 5,000% by weight of said detergent, and said detergent comprises solid abrasive particles having a pencil hardness of 6B to 9H and are present in the detergent in an amount of 1 to 10% by weight, a protective layer-forming component and 50 to 98.9% by weight of water, wiping a hard surface to be cleaned to apply said detergent to said hard surface and to release dirt from said hard surface, and then wiping said hard surface with a wiping sheet to remove said dirt and said detergent and to form a protective layer on said surface.

2. A detergent-impregnated article comprising a base body and a detergent impregnated in said body, said detergent comprising solid abrasive particles having a pencil hardness of 6B to 9H and are present in the detergent in an amount of 1 to 10% by weight, a protective layer-forming component and 50 to 98.9% by weight of water, and said base body containing 50 to 5,000% by weight of said detergent.

3. The detergent-impregnated article according to claim 2, wherein said solid abrasive particles consist of organic polymer particles and/or inorganic particles.

4. The detergent-impregnated article according to claim 2, wherein said solid abrasive particles comprise silicone or a water-insoluble inorganic substance.

5. The detergent-impregnated article according to claim 2, wherein said solid abrasive particles have an average primary particle size of 0.1 to 100 μm.

6. The detergent-impregnated article according to claim 2, wherein said protective layer-forming component comprises silicone oil.

7. The detergent-impregnated article according to claim 2, wherein said base body is capable of absorbing 50 to 5000% by weight of said detergent based on its own weight with no load applied thereon.

8. The detergent-impregnated article according to claim 2, wherein said base body comprises paper, nonwoven fabric, woven fabric, knitted fabric, a pulp sheet or a porous structure.

9. The method according to claim 1, wherein a static friction coefficient of the surface to be cleaned on which a protective layer is formed is 0.1 to 1.0.

10. The detergent-impregnated article according to claim 2, wherein said solid abrasive particles consist of at least one of:

(A) at least one polymer obtained by polymerizing a monomer or monomer mixture containing at least one ethylenically unsaturated monomer selected from the group consisting of an alkyl acrylate or methacrylate having 1 to 8 carbon atoms in the alkyl moiety thereof, a mono- or dialkyl itaconate or fumarate having 1 to 5 carbon atoms in the alkyl moiety thereof, maleic anhydride, vinylidene chloride, styrene, divinylbenzene, vinyl chloride, vinyl acetate, vinyl acetal, ethylene, propylene, butene, butylene, methylpentene, butadiene, vinyltoluene, acrylonitrile, methacrylonitrile, acrylamide, acrylic acid, methacrylic acid, itaconic acid, tumaric acid, citraconic acid, crotonic acid, β-acryloxypropionic acid, or a hydroxyalkyl acrylate or methacrylate having 1 to 6 carbon atoms in the alkyl moiety thereof;

(B) a silicone rubber having at least one constituent unit selected from the group consisting of a unit represented by formula (I) and a unit represented by formula (I'):

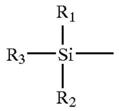

(I)

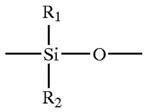

(I')

wherein $R_1$, $R_2$ and $R_3$ each individually represent an alkyl, alkoxy or hydroxyalkyl group having 1 to 100 carbon atoms, a hydroxyl group, a carboxyl group, a carboxylalkyl group, an N-(2-aminoalkyl)aminoalkyl group, an aminoalkyl group, an amino group, an epoxyalkyl group, an epoxy group, a methylpolyoxyethylenealkyl group, a hydroxypolyoxy-ethylenealkyl group, a methylpolyoxyethylene polyoxypropylene group, a hydroxypolyoxyethylene polyoxypropylene group, an alkyl-polyoxcpropylene group, a polyoxyethylene group, a phenyl group or a fluorinated alkyl group;

(C) at least one resin selected from nylon, polyester, an epoxy resin, an aminoalkyd resin, a urethane resin, polyacetal, and polycarbonate;

(D) an organopolysilsesquioxane; and (E) at least one water-insoluble inorganic substance selected from silica, porous silica, sodium silicate glass, soda-lime glass powder, silicon carbide, a sheet silicate, quartz sand, aluminum oxide, magnesium oxide, titanium oxide, calcium carbonate, calcium phosphate, chromium oxide, emery, dolomite, mica powder, siliceous stone, kaolinite, halloysite, montmorillonite, illite, vermiculite, hectorite, bentonite, chitin powder, chitosan powder, and hydroxyapatite.

11. The detergent-impregnated article according to claim 2, wherein said solid abrasive particles have an average primary particle size of 0.01–10 μm.

12. The detergent-impregnated article according to claim 2, wherein the solid abrasive particles are present in the detergent in an amount of 0.1 to 5% by weight.

* * * * *